Nov. 3, 1925.
F. GELSTHARP
1,560,079
METHOD AND APPARATUS FOR MAKING SHEET GLASS
Filed Aug. 8, 1923    5 Sheets-Sheet 1
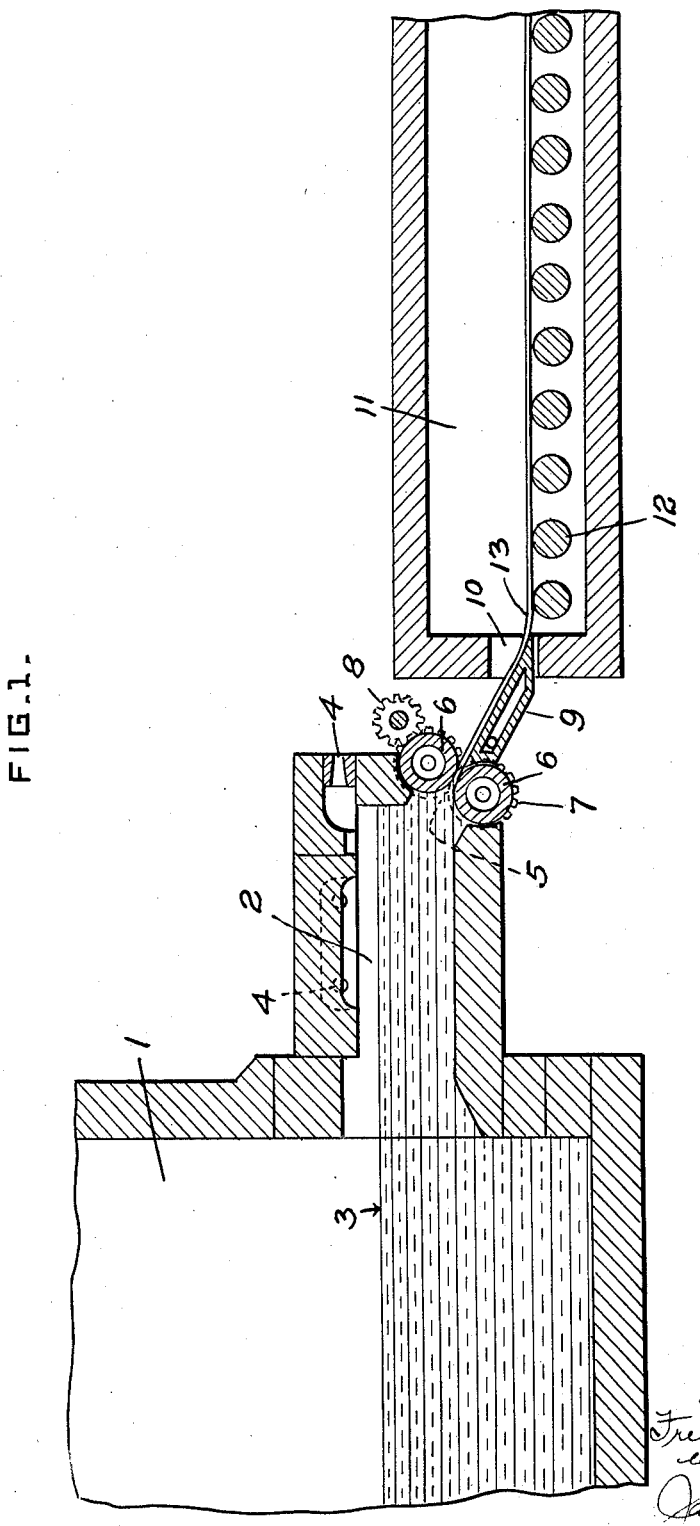
INVENTOR
Frederick Gelstharp
by
James C. Bradley
atty

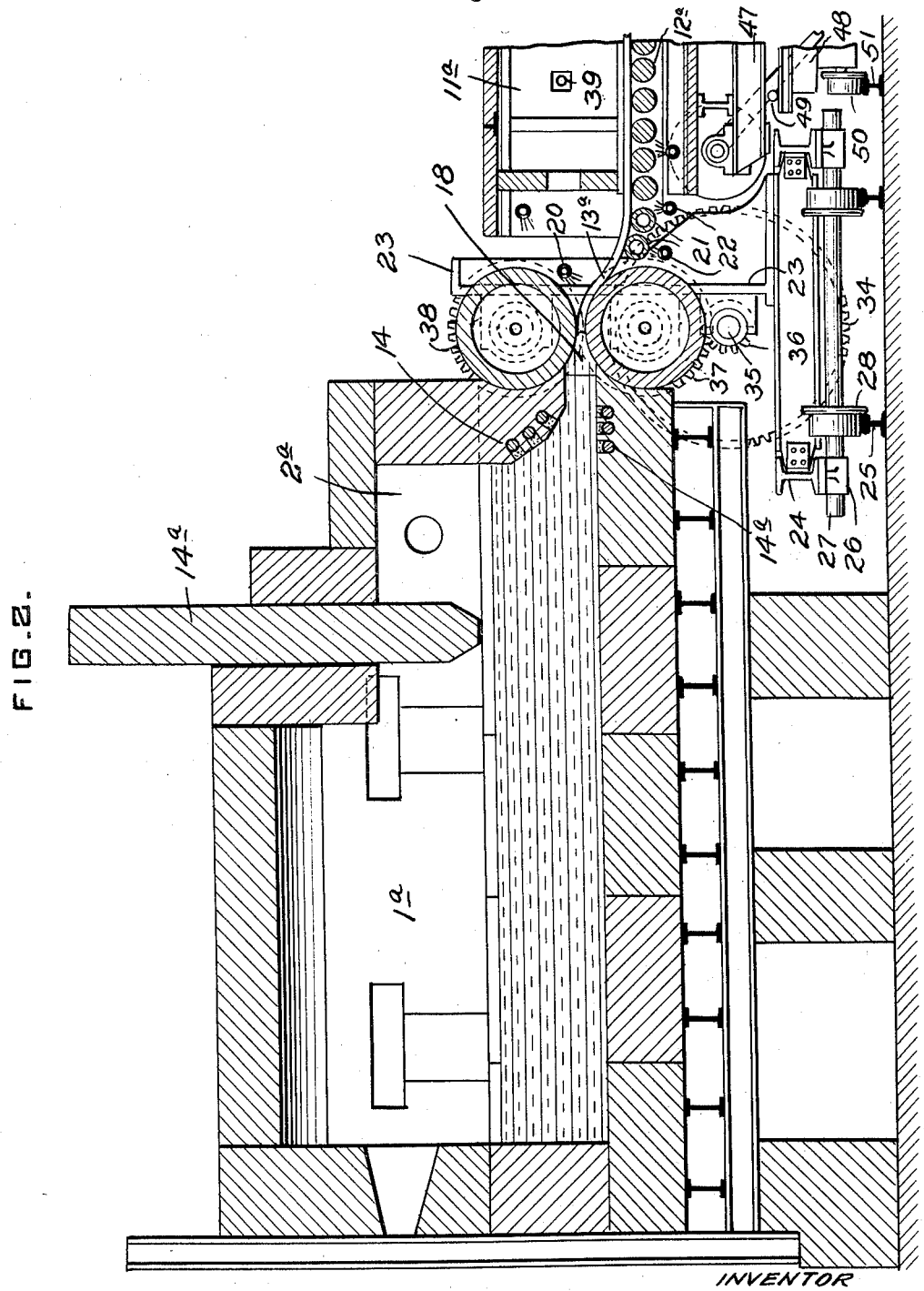

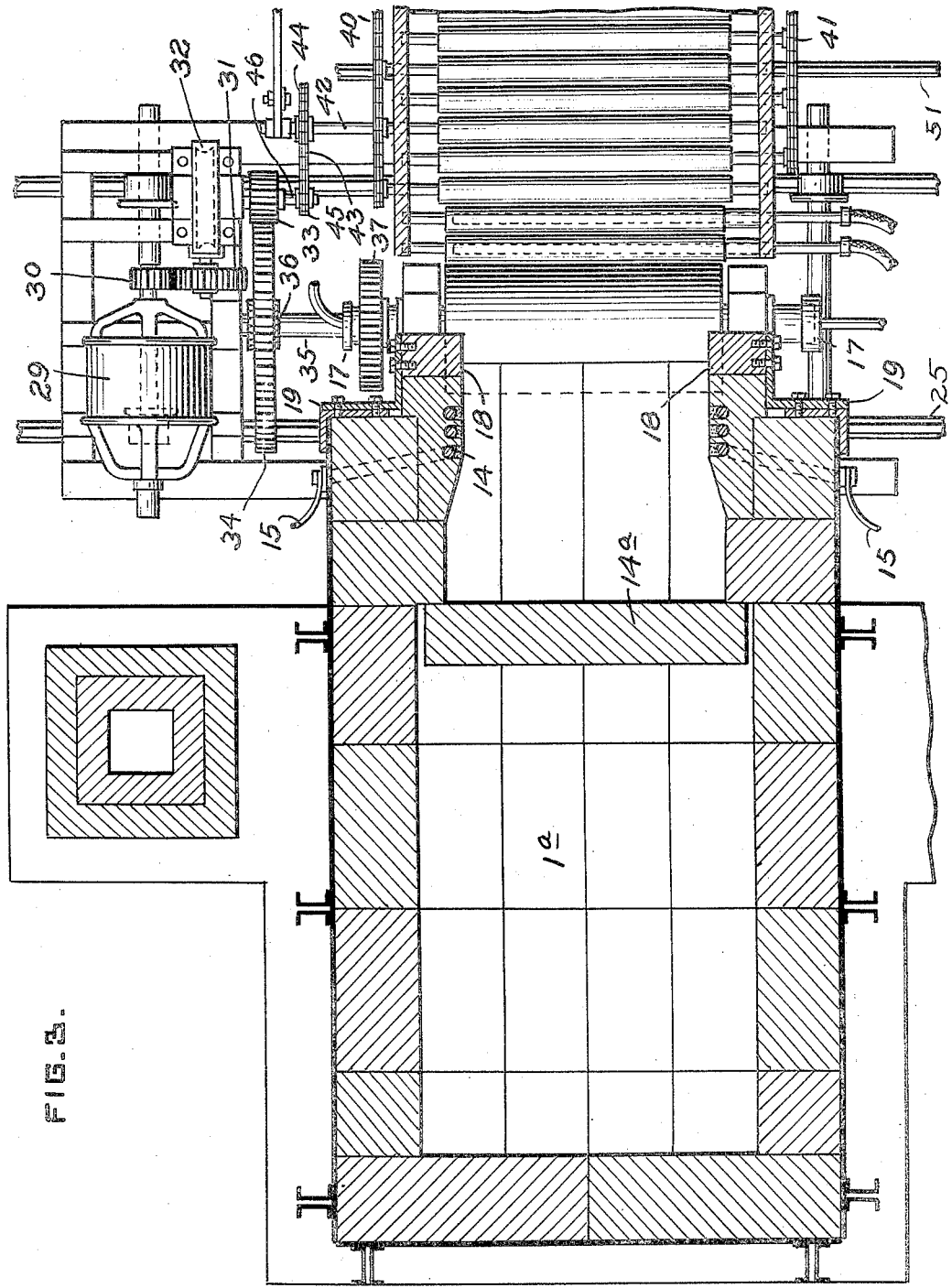

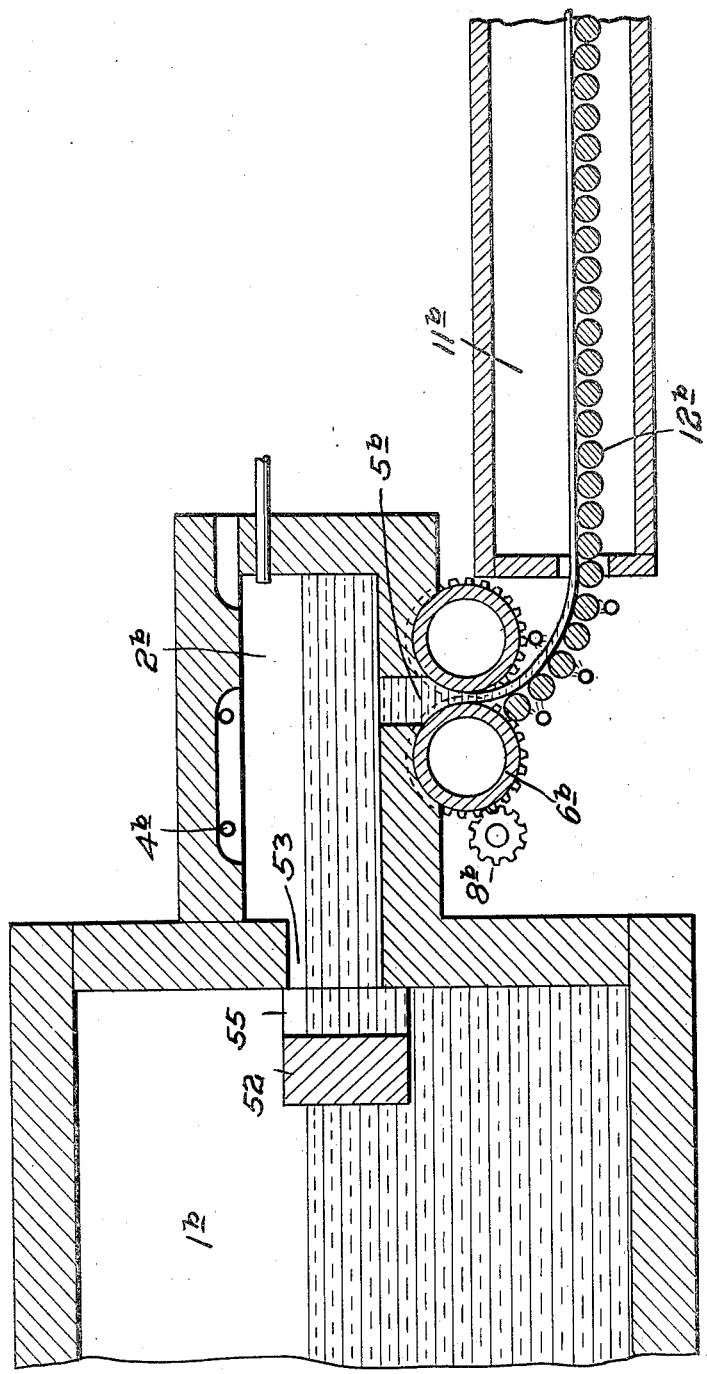

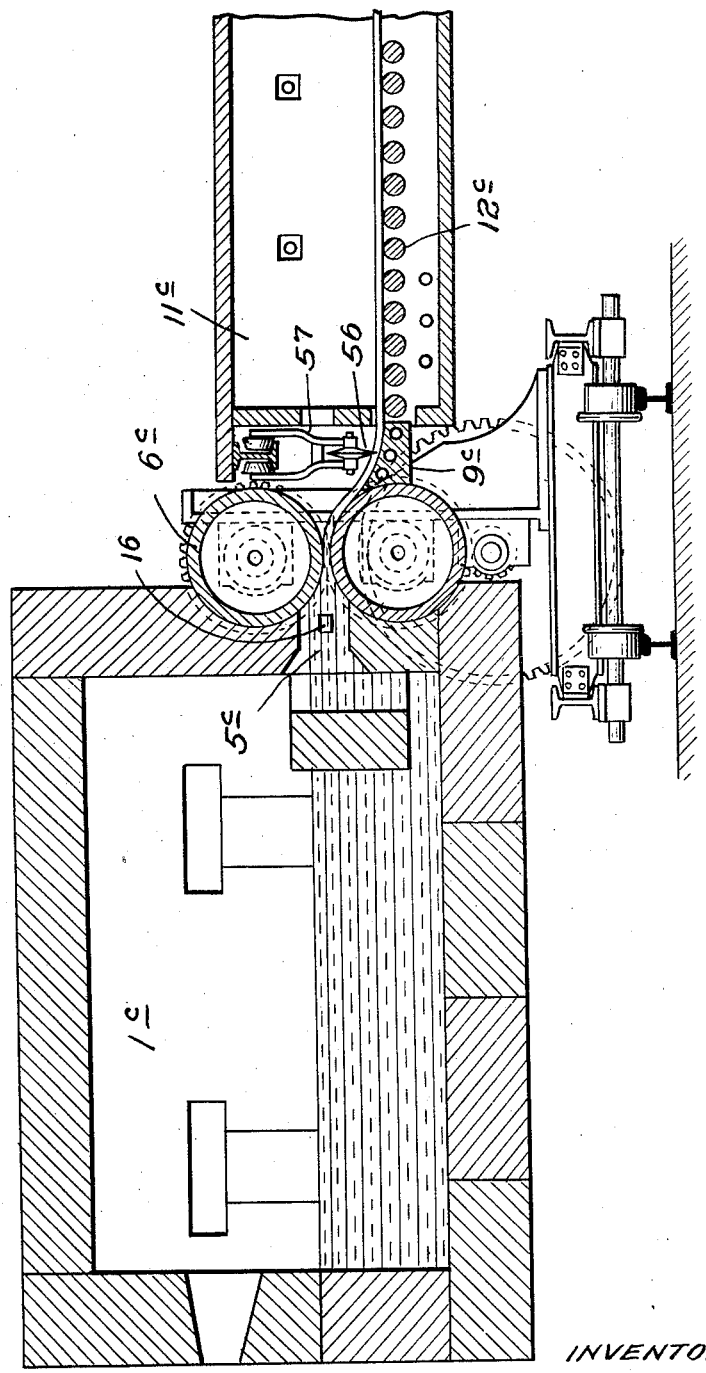

Patented Nov. 3, 1925.

1,560,079

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

METHOD AND APPARATUS FOR MAKING SHEET GLASS.

Application filed August 8, 1923. Serial No. 656,441.

*To all whom it may concern:*

Be it known that I, FREDERICK GELSTHARP, a citizen of the United States, and a resident of Tarentum, in the county of Allegheny and State of Pennsylvania, have made a new and useful invention in Improvements in Methods and Apparatus for Making Sheet Glass, of which the following is a specification.

This application is a combination and consolidation of the apparatus subject matter of two applications for Letters Patent heretofore filed by me, Serial No. 493,311, filed August 18, 1921, and Serial No. 531,053, filed January 23, 1922, together with a part of the subject matter of a third application, Serial No. 531,054, also filed on January 23, 1922. In the accompanying drawings, I have illustrated a number of arrangements of apparatus embodying the invention in its broad phases.

Figure 1 is a vertical longitudinal sectional view of the apparatus in simple form. Fig. 2 is a like view of the apparatus in a more extended and elaborate form. Fig. 3 is a partial horizontal section and partial plan view of the apparatus of Fig. 2. And Figs. 4 and 5 are longitudinal sectional views of other modifications.

In Figs. 1 to 4, a glass melting tank is shown as provided with an extension or forehearth, while in the form shown in Fig. 5 there is no forehearth, but the glass is taken directly from the body of the tank. In the construction of Fig. 1, the numeral 1 designates the melting portion of the tank; 2 is the forehearth; 3 is the glass level; 4 are supplemental burners for heating the glass in the forehearth; and 5 is the outlet for the molten glass. This outlet may be wholly below the glass level as shown in Figs. 1, 2, and 3, or the upper edge or face of the outlet may be above the level of the glass, as shown in Fig. 5. In each case the outlet will be of a length corresponding to the width of the sheet to be produced. Arranged in or closely adjacent to the outlet are the sheet forming rolls 6, 6. In each case here illustrated these rolls rotate partially in the outer portion of the tank wall. But in any case they should be arranged so closely adjacent to the discharge outlet that they will obstruct the free flow of the glass through the outlet and serve to control such flow while forming the sheet. In each case the rolls are hollow and are provided with suitable connections for the admission and discharge of water or other cooling fluid, and they are of course driven.

In Figure 1, I have generally indicated driving means consisting of spur gears 7, 7, secured to the shafts of the rolls 6, 6, and meshing with each other, one of these gears being driven by the pinion 8 from any suitable source of power. On the exit side of the roll pass in Fig. 1 is a supporting platen 9, which is also preferably made hollow, and may be cooled by water or other suitable fluid. The lower end of the platen 9 extends into the opening 10 at the inlet end of the leer 11. This leer is shown as provided with a plurality of rollers 12 upon which the sheet of glass rests. In Fig. 1 the showing of the leer is conventional only. The rotation of the sheet forming rolls serves to form and continuously feed forward the sheet of glass 13, while at the same time controlling the flow of the molten glass, which is supplied to the rolls by the head pressure of the bath within the tank.

It will be noticed that the operation is therefore an essentially different one from the well known operation of "drawing" glass, wherein there is a stretching of the glass in the body of the cylinder or sheet being drawn. In the operation of the apparatus herein shown and described, the sheet is formed by the controlled natural flow of the glass through the pass between the sheet forming rolls, so that there is no stretching of the sheet during its formation. It is preferred also, as shown in the drawings, that the sheet shall not subsequently be subjected to any stretching. I therefore prefer to form the sheet of substantially its finished dimensions in the pass between the rolls 6, 6, and the rolls serve to feed it continuously forward into and through the leer, in which it flattens naturally under the joint influences of temperature and gravity, and is annealed as well.

If and when it is desired for any reason to stop the operation, the sheet forming rolls may be rotated in the reverse direction, thus stopping the feed of the glass.

Referring now to Figs. 2 and 3 of the drawings, I have shown a gate 14ª which will be provided with suitable connections for raising and lowering it to control or cut off communication between the melting portion 1ª of the tank furnace and the forehearth 2ª. I have also indicated enveloping the discharge outlet and close to the rolls 6ª, electrical heating means, preferably in the form of a heating coil 14 of resistance material such as nichrome, contained in grooves in the walls of the outlet, and sealed in place by refractory cement, and having suitable connections 15 for the passage of the current. This electrical heating means may be used to advantage to prevent "freezing" of the glass in the outlet during suspension of operations, as well as to regulate the temperature of the glass during the operation as may be desired. It has, I believe, an important further function in assisting in preventing devitrification of the molten glass in said outlet, which otherwise might occur.

In the form shown in Fig. 5 I have shown electrical terminals 16 arranged on opposite sides of the outlet, in which case the heating current will pass through the molten glass itself from one terminal to the other.

If so desired the glass in the outlet may be allowed to freeze, and then such chilled glass will constitute a part of the side wall of the tank, so that the level of the glass in the tank can be raised by melting new glass. After having brought the mass to a proper working temperature, about 2000° F., the frozen glass in the outlet may be melted by the heat generated by the passage of the electric current, and the rolls may be operated again for the production of another continuous sheet or ribbon. In this way the use of the gate may be eliminated. In Fig. 3, I have shown connections 17 swivelled to the ends of the roll shafts, or otherwise suitably connected thereto, for the admission and discharge of the cooling fluid.

In order to close the angular spaces adjacent to the opposite ends of the rolls, metal closure members 18 of proper form are preferably employed, such closure members being secured to the furnace structure by means of the angles 19 (Fig. 3). These metal closure members are more durable than clay and may be replaced readily. Their outside exposure to the atmosphere is sufficient, in connection with their proximity of the water cooled rolls, to prevent the glass sticking to them. They are preferably made of heat resisting material such as nichrome.

It will be observed that the discharge outlet (and consequently the width of the sheet) is shown as less than the width of the body of the melting chamber, and less than the width of the rear portion of the forehearth (Fig. 3). I believe this construction to be of advantage in imparting smoothness to the opposite edges of the sheet. There is also some tendency at times, as I have found, for the edges of the sheet to cool too rapidly, and thus crack or cause warping of the sheet. To overcome this difficulty I provide the burners 20 (Fig. 2), one at each edge of and above the sheet, as it issues from the pass between the rolls. To support and guide the sheet in its passage from the rolls to the leer, I provide supporting rollers 21, which may be idlers as shown or may be driven if desired, and which are preferably hollow and fluid cooled.

I have also found it of advantage to cause the sheet after it issues from the forming pass to continue upon the surface of one of the water cooled forming rolls 6ª, which as shown in Figs. 2 and 3 will of course be the lower roll. Such contact should persist for a substantial distance. The temperature of the contacting surface of the sheet is thereby reduced, and a skin is formed, which not only renders the sheet sufficiently cool and stiff to avoid undue sagging in its passage to the leer, but also has the further important effect of helping to preserve the cross sectional form and size of the sheet as defined by the sheet forming rolls.

At the same time I have found it desirable to apply some heat to this chilled surface of the sheet during its passage from the rolls to the leer, or in the inner portion of the leer itself. This I accomplish by the burner pipes 22 shown in Fig. 2, arranged immediately beneath the supporting rollers 21, which burners extend transversely across the width of the sheet, and from which flames can be projected upwardly to reheat the surface of the sheet. This surface heating, I believe, operates in conjunction with the heat in the hot body of the sheet to impart to the sheet throughout its cross section a substantially uniform temperature, thus facilitating the flattening of the sheet in its passage through the leer and tending to prevent its warping after it has once flattened. As has been indicated, the flattening of the sheet is preferably by gravity, and I have found in practice that it is possible to secure in this way a perfectly flat sheet, and moreover a sheet having so smooth a surface that in the production of plate glass a minimum amount of grinding is necessary, while glass for other purposes can be made without any grinding or polishing at all, the surface depending on the degree of smoothness of the roll.

In order to provide for the removal of the rolls from the front of the passageway 4ª, when it is necessary to gain access to this portion of the furnace for replacement or repair, the rolls are mounted upon standards 23 carried by the truck 24, which truck is mounted upon the transversely extending rails 25. This truck also carries the driving mechanism for the rolls, so that the complete apparatus may be readily moved out of the way when desired. The truck is provided with bearings 26, in which are mounted the truck axles 27, carrying the wheels 28. As indicated in Fig. 2, the bearings 26 are capable of longitudinal movement upon the shafts 27, so that the truck and rolls carried thereby may be moved away from the front of the furnace a short distance before moving them laterally. This permits of the more ready removal and replacement of the truck and parts carried thereby.

Any desired type of driving means for the rolls may be employed, the one shown preferably comprising the electric motor 29 and reducing gearing intermediate the motor and the lower roll $6^a$. The reducing gearing includes the pinion 30, meshing with the spur gear 31, which in turn drives a worm gear in the casing 32. The shaft of the worm wheel carries the pinion 33, which drives the large spur gear 34 on the shaft 35 (Fig. 2), and this shaft 35 carries a small pinion 36 engaging the spur gear 37 on the shaft of the lower roll $6^a$. This gear 37 meshes with the gear 38 (Fig. 2) of equal size upon the shaft of the upper roll. Any other type of gearing may be employed, but the above arrangement is set forth as constituting one form which has been found satisfactory.

The end only of the leer $11^a$, to which the glass ribbon $13^a$ is conducted is shown. This leer contains the driven rollers $12^a$ for carrying the sheet through a sufficient distance to anneal it and permit it to cool to such a point that it will not fracture when exposed to the atmosphere outside the leer. These rollers are placed relatively close together, as indicated, so as to reduce the tendency of the glass, while in a relatively plastic condition, to become deformed. By this arrangement and by a proper regulation of temperature, as heretofore explained, a sheet is produced having a very flat surface and one which requires much less grinding than ordinary plate glass as produced by the usual casting method. The leer is heated by suitable burners, one of which, 39, is shown in Fig. 2. The ends of the rollers $12^a$ are extended through the sides of the leer and alternate rollers on the same side are provided with sprockets which are connected to the endless chains 40 and 41 (Fig. 3) on each side of the machine. These sprocket chains are operated from the countershaft, 42, driven from the gearing of the motor 29 by means of the sprocket chain 43, such chain passing over the sprocket 44 on the shaft 42 and over the sprocket 45 on the shaft 46. This is, of course, only one of a number of ways in which the rollers might be driven. The leer is preferably supported by the framework 47 (Fig. 2) carried by a substructure 48 and intermediate the framework and the substructure are rollers 49 to permit of the movement of the entire leer endwise, to give more clearance between the leer and the furnace, when it is desired to remove the track and rolls or do other work requiring more room at this point. The section of the leer next the rolls is also provided with wheels 50 mounted on the track 51 so that this part of the leer can be gotten out of the way to give convenient access to the front of the rolls and to the interior of the leer itself.

Referring to Fig. 4, I have illustrated a modification in which the discharge outlet $5^b$ for the molten glass is arranged in the bottom wall of the forehearth $2^b$, instead of in its side wall. The sheet forming rolls $6^b$ correspond in construction and operation with those of the other figures of the drawings, and the continuously formed sheet is fed downward by the rolls, into and through the leer.

In this case I have shown a float 52 which will control the flow from the melting chamber of the tank into the forehearth, as well as act as a skimmer in the current of the glass. When it is desired to entirely close the passage 53, a pair of spacing blocks 55 at the opposite ends of the float will be removed, and the float brought up against the inlet end of the passage. The parts $8^b$, $11^b$ and $12^b$ correspond to the parts 8, 11 and 12 respectively of Fig. 1.

In all cases where a forehearth is used, I wish it to be understood that I do not intend to limit myself in respect of form, but I mean by the term forehearth any extension of the melting tank, whether relatively shallow or of full tank depth, or even deeper, and of any suitable shape, in which the level of the glass is the same as the level of the glass in the melting portion of the tank.

As has been stated already, in the modification shown in Fig. 5 no forehearth is present, but the glass passes directly from the melting chamber $1^c$ through a suitable outlet $5^c$ to the pass between the sheet forming rolls $6^c$. In this case I have shown the glass level below and out of contact with the upper surface of the discharge outlet, but, as before, the head pressure of the body of glass within the tank still feeds the glass to the forming rolls. In this case I have also shown a supporting platen having cooling pipes passing therethrough, to support the sheet on its way from the forming rolls to the leer $11^c$. A cutting off wheel 56 carried by the trolley 57 is also illustrated. The parts $9^c$, $11^c$ and $12^c$ correspond to the parts 9, 11 and 12 respectively of Fig. 1.

What I claim is:

1. A method of manufacture of sheet glass which comprises melting and maintaining in a tank furnace a reservoir of molten glass, supplying the glass by the head pressure within the tank to a sheet forming pass between rolls arranged to control its rate of flow from the tank, and rotating the rolls and continuously forming a glass sheet having substantially uniform thickness throughout.

2. A method of producing sheet glass, which consists in forming a continuous plastic ribbon from a melting tank, feeding the ribbon ahead on constantly changing lines of transverse support exposed at a temperature and for a distance such as to cause it to flatten of its own weight as it moves along, and permitting the flattened ribbon to stiffen in such flattened form and then annealing the ribbon.

3. A method of manufacturing sheet glass in a continuous operation which comprises melting and maintaining in a tank furnace a reservoir of molten glass, supplying the glass by the head pressure within the tank to a sheet forming pass and chilling its surface as it passes therethrough, heating the sheet after it leaves the pass to raise it to approximately a uniform temperature throughout, feeding it forward over a bed of constantly shifting separated lines of support at a relatively high temperature until it is flattened and gradually cooling the sheet in such flattened form as it moves along.

4. A method of manufacture of sheet glass which comprises melting and maintaining in a tank furnace a reservoir of molten glass, supplying the glass laterally by the head pressure within the tank to a sheet forming pass between rolls one above the other arranged to control its rate of flow from the tank, said pass being of dimensions adapted to form the finished sheet, cooling the rolls internally, rotating the rolls, and continuously forming a sheet of substantially uniform thickness throughout and feeding it forward, and causing the lower surface of the sheet in its travel from the roll pass to continue in contact with the surface of the lower roll.

5. A method of manufacture of sheet glass which comprises melting and maintaining in a tank furnace a reservoir of molten glass, supplying the glass by the head pressure within the tank to a sheet forming pass between rolls arranged to control its rate of flow from the tank, said pass being of dimensions adapted to form the finished sheet, rotating the rolls and forming and feeding forward the sheet continuously, cooling one surface of the sheet adjacently to the roll pass, reheating said cooled surface, and flattening and annealing the sheet.

6. Apparatus for forming sheet glass, comprising a melting tank carrying a glass bath and having a passage through its side wall, so located as to permit the discharge therethrough of molten glass under head pressure of the tank, a pair of rolls lying opposite the passage and having parallel sheet forming surfaces constituting the outlet orifice of the passage, means for rotating the rolls and means for cooling the rolls.

7. In apparatus for the manufacture of sheet glass, the combination with a melting tank provided with an outlet so located as to permit the discharge therethrough of molten glass under the head pressure within the tank, of sheet forming rolls arranged to control the rate of flow of the glass from said outlet, means for rotating the rolls, and means arranged on opposite sides of the path of the sheet on the delivery side of the rolls for heating the opposite edges of the sheet.

8. In apparatus for the manufacture of sheet glass, the combination with a receptacle for molten glass provided with a horizontal outlet in its side wall so located as to permit the discharge therethrough of molten glass under the head pressure within the receptacle, of a pair of horizontal rolls blocking said outlet and arranged to control the rate of flow of the glass from said outlet and having a pass with parallel sheet forming surfaces adapted to form the sheet of substantially finished cross sectional dimensions, means for rotating the rolls, means for cooling the lower roll, and a support for the sheet arranged below the plane of the roll pass, whereby the lower face of the sheet after leaving the roll pass is caused to continue in contact with the surface of the lower cooled roll.

9. In apparatus for the manufacture of sheet glass, the combination with a receptacle for molten glass provided with an outlet so located as to permit the discharge therethrough of molten glass under the head pressure within the receptacle, of rolls arranged to control the rate of flow of the glass from said outlet and having a pass adapted to form the sheet of substantially finished cross sectional dimensions, means for rotating the rolls, means adjacent to the roll pass for cooling one surface of the formed sheet, means for reheating said cooled surface, and means for causing the sheet to flatten of its own weight.

10. Apparatus for forming sheet glass, comprising a tank carrying a glass bath and having a passage through its wall, a pair of rolls lying opposite the passage and spaced apart to constitute the outlet orifice of the passage, means for rotating the rolls, means for cooling the rolls, a leer having its receiving end adjacent the rolls and adapted to receive the glass from between the rolls, and a carriage upon which the rolls are mounted and movable laterally to carry the rolls from between the tank and leer.

11. Apparatus for forming sheet glass, comprising a tank carrying a glass bath and having a passage through its wall, a pair of rolls lying opposite the passage and spaced apart to constitute the outlet orifice of the passage, means for rotating the rolls, means for cooling the rolls, and a carriage upon which the rolls are mounted for movement toward and from the tank and laterally with respect thereto.

12. In combination in apparatus for forming sheet glass, a tank having in its wall a feed slot, a pair of rolls spaced apart and constituting the outlet from said slot, means for rotating the rolls forwardly and backwardly, and electric heating means in the furnace wall back of the rolls to keep the glass from freezing at such point when the feed is stopped and the rolls rotated backwardly.

13. Apparatus for forming sheet glass comprising a tank carrying a glass bath and having a passage through its wall, a pair of rolls lying opposite the passages and spaced apart to constitute the orifice or outlet of the passage, means for rotating the rolls, means for cooling the rolls, and a leer with its end adjacent the rolls and mounted for movement transversely of the line of movement of the sheet formed between the rolls.

14. Apparatus for forming sheet glass comprising a tank carrying a glass bath and having a passage through its wall, a pair of rolls lying opposite the passage and spaced apart to constitute the orifice or outlet of the passage, means for rotating the rolls, means for cooling the rolls, and a leer member in position to receive the glass sheet formed between the rolls and mounted for movement away from the rolls and laterally with respect thereto.

In testimony whereof, I have hereunto subscribed my name this 3rd day of August, 1923.

FREDERICK GELSTHARP.